United States Patent
Natarajan et al.

(10) Patent No.: US 12,267,720 B2
(45) Date of Patent: Apr. 1, 2025

(54) METHOD FOR AUTOCONFIGURING MICROSLICES IN A WIRELESS ENTERPRISE NETWORK

(71) Applicant: Celona, Inc., Cupertino, CA (US)

(72) Inventors: Preethi Natarajan, Saratoga, CA (US); Mehmet Yavuz, Palo Alto, CA (US); Rajeev Shah, Los Gatos, CA (US)

(73) Assignee: CELONA, INC., Campbell, CA (US)

( * ) Notice: Subject to any disclaimer, the term of this patent is extended or adjusted under 35 U.S.C. 154(b) by 0 days.

(21) Appl. No.: 17/010,520

(22) Filed: Sep. 2, 2020

(65) Prior Publication Data

US 2022/0070720 A1    Mar. 3, 2022

(51) Int. Cl.
*H04W 28/02* (2009.01)
*H04W 24/02* (2009.01)

(52) U.S. Cl.
CPC ....... *H04W 28/0268* (2013.01); *H04W 24/02* (2013.01); *H04W 28/0215* (2013.01)

(58) Field of Classification Search
None
See application file for complete search history.

(56) References Cited

U.S. PATENT DOCUMENTS

| | | |
|---|---|---|
| 9,443,192 B1 | 9/2016 | Cosic |
| 2010/0161595 A1 | 6/2010 | Martin et al. |
| 2010/0192005 A1 | 7/2010 | Das et al. |
| 2015/0142962 A1 | 5/2015 | Srinivas et al. |
| 2015/0220400 A1 | 8/2015 | Resch et al. |
| 2018/0287891 A1* | 10/2018 | Shaw ............... H04W 24/02 |
| 2019/0132728 A1* | 5/2019 | Shekhar ............ H04W 8/20 |
| 2019/0364565 A1* | 11/2019 | Hmimy ............. H04W 36/06 |

(Continued)

OTHER PUBLICATIONS

Kim, Harry, International Search Report and Written Opinion received from the USRO dated Dec. 7, 2021 for appln. No. PCT/US2021/048715, 8 pgs.

(Continued)

*Primary Examiner* — Andre Tacdiran
(74) *Attorney, Agent, or Firm* — Jaquez Land Greenhaus & McFarland; Bruce W. Greenhaus

(57) ABSTRACT

Methods and apparatus for autoconfiguring microslices in enterprise wireless communication networks using a microslice knowledgebase in a remotely located orchestration platform. Microslices are independent end-to-end logical networks operating on a shared physical infrastructure, which ensure certain Quality of Service (QoS) and Service Level Objective (SLO) requirements are met for different service types or applications. Any of the enterprise networks may be a Citizen's Broadband Radio Service (CBRS) system. A microslice knowledgebase unit in the orchestration platform configures microslices for the enterprise networks based upon communication requirements of applications, devices, and groups of devices such as service type, bandwidth requirements, using machine learning and artificial intelligence to learn communication requirements of each enterprise deployment. The microslice configuration unit in the knowledgebase may develop microslice templates based upon enterprise type, which can be used to better make recommendations to enterprise networks during initial deployment and afterwards.

5 Claims, 10 Drawing Sheets

(56) References Cited

U.S. PATENT DOCUMENTS

| | | | |
|---|---|---|---|
| 2020/0015158 A1* | 1/2020 | So | H04W 8/20 |
| 2020/0169921 A1* | 5/2020 | Zhu | H04W 8/02 |
| 2020/0228405 A1* | 7/2020 | Fang | H04L 41/0843 |
| 2020/0412565 A1* | 12/2020 | Sanders | H04L 12/2801 |
| 2021/0235290 A1* | 7/2021 | Boyapalle | H04L 43/0805 |
| 2021/0297876 A1* | 9/2021 | Bellamkonda | G06N 20/00 |

OTHER PUBLICATIONS

Meneses, et al., "Micro and Macro Network Slicing: An Experimental Assessment of the Impact of Increasing Numbers of Slices", Wireless Personal Communications 106.1 (2019): 119-134.

Wang, Xin, International Preliminary Report on Patentability received from WIPO dated Mar. 16, 2023 for appln. No. PCT/US2021/048715, 7 pgs.

* cited by examiner

| Example Microslice Definition | | |
|---|---|---|
| Field Name | Value Example | Field Description |
| Device group name | Security | All the handhelds and smartphones assigned to the security organization |
| Admin | Joe | Administrator for this device group |
| Trusted | YES/NO | Trust device request for microslice access |
| VLAN or VxLAN ID | 333 | Broadcast domain for devices in this device group |
| DHCP | x.x.x.x/y | DHCP server address for this device group |

FIG. 2C

| Example Microslice Assignment to Device Groups | | | | |
|---|---|---|---|---|
| Microslice Name: | Streaming | IP Camera | Video Conf | Default (Internet) |
| Device Group 1 | X | | X | X |
| Device Group 2 | | X | | X |
| Default Group | | | | X |

FIG. 2D

| Example Microslice Definition | | |
|---|---|---|
| Field Name | Value Example | Field Description |
| Micro slice name | Streaming | A descriptive name to identify the purpose of this micro slice |
| Allowed application definitions | Specify a list | List of applications that will be mapped to this microslice |
| Min. guaranteed throughput | 100Mbps | Minimum throughput guaranteed for each device |
| Max allowed throughput | 200Mbps | Maximum throughput cap on the device |
| MPDB (Maximum Packet Delay Budget) | 20ms | Maximum latency for any packet flowing through this slice |
| MPLR (Maximum Packet Loss Rate) | $10^{\wedge}\text{-e}3$ | Maximum packet loss rate for any flow through this slice |
| Priority | 1 | This will dictate preemption in case of congestion in the RAN. Values 1-15 are allowed. Lower number indicates critical priority. |

FIG. 2E

METHOD FOR AUTOCONFIGURING MICROSLICES IN A WIRELESS ENTERPRISE NETWORK

CROSS-REFERENCE TO RELATED APPLICATION

Reference is made to microslice application: "Method and Apparatus for Microslicing Wireless Communication Networks with Device Groups, Service Level Objectives, and Load/Admission Control", application Ser. No. 16/790,645 filed Feb. 13, 2020.

BACKGROUND

Technical Field

The disclosed method and apparatus relate to wireless communications networks and more particularly to methods and apparatus for creating and configuring the network to provide efficient and appropriate signal paths through the network for network devices such as UE devices, and improving the performance of an enterprise network.

Background

Wireless technology is rapidly advancing. Faster and more numerous wireless broadband communication networks have been installed around the globe. These networks have become key components of a worldwide communication system that connects people and businesses at speeds and on a scale unimaginable just a couple of decades ago. The rapid growth of wireless communication is a result of increasing demand for more bandwidth and services.

Enterprises are increasingly integrating wireless digital solutions into their business structure and implementing them within their business location, and therefore have created a huge demand for computing resources, data storage and networking infrastructure for the purpose of supporting optimal performance of their business applications. To this end, wireless network systems are being developed to make more effective use of the spectrum within a business enterprise for wireless communication, in order to improve and expand communication capabilities within the organization and between the organization and the external entities. These improved communication capabilities increase business efficiency and reduce costs, and accordingly, the wireless industry has experienced tremendous growth in recent years.

The rapid growth and advancement of wireless communication networks is in many ways supported by standards. For example, 4G LTE has been widely deployed over the past years, and the next generation system, 5G NR (New Radio) is now being deployed. In these wireless systems, multiple mobile devices are served voice services, data services, and many other services over wireless connections so they may remain mobile while still connected.

As will be discussed herein, one type of wireless communication network that has recently become available for general use within business enterprise locations is a CBRS network, which utilizes the CBRS radio band of 3550-3700 MHz, nominally divided into fifteen channels of 10 MHz each. In order to make this spectrum available, however, certain prior users (including the military) have been given a higher priority to access the spectrum. In order to implement this system, and ensure that certain users are given higher priority, use of this radio band is subject to spectrum control by a Spectrum Access System (SAS). Any enterprise implementing a CBRS network must follow the directions given by the SAS, such as which channels it can use, how much power it can transmit, and previously authorized channels may be suspended by the SAS.

FIG. 1 is an illustration of a basic configuration for a communication network 100, such as a "4G LTE" (fourth generation Long-Term Evolution) or "5G NR" (fifth generation New Radio) network. Through this network configuration, user equipment (UE) 101 can connect to External Packet Data Networks (PDNs) 103 and access any of a variety of services such as the Internet, Application Servers, Data Services, Voice Services, and others.

UE

As used herein, the term "UE", or "devices", or "UE devices" refers to a wide range of user devices having wireless connectivity, such as a cellular mobile phone, an Internet of Things (JOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed at a fixed location. For example, a factory sensor may be installed at a fixed location from which it can remotely monitor an assembly line or a robotic arm's movement. In the illustration of FIG. 1, the UEs 101 include a first mobile phone 101a, a second mobile phone 101b, a laptop computer 101c, and a printer 101d.

The UEs 101 connect wirelessly over respective communication links 105 to a Radio Access Network (RAN) 107 that includes a base station/access point (BS/AP) 109. One of the advantages of such networks is their ability to provide communications to and from multiple wireless devices and provide these wireless devices with access to a large number of other devices and services even though the devices may be mobile and moving from location to location.

BS/AP

The term 'BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

Core Network

The RAN 107 connects the UEs 101 with the Core Network 111. One function of the Core Network 111 is to provide control of wireless signaling between the UEs 101 and the RAN 107, and another function is to provide access to other devices and services either within its network, or on other networks such as the External PDNs 103. Particularly, in cellular networks and in private networks, the BS/AP 109 can receive wireless signals from, and send wireless signals to, the UEs 101. The RAN 107 is coupled to the core network 111; therefore, the RAN 107 and the Core Network 111 provide a system that allows information to flow between a UE in the cellular or private network and other networks, such as the Public Switched Telephone Network (PSTN) or the Internet. Wireless data transmission between a UE 101 and the BS/AP 109 occurs on an assigned channel, such as a specific frequency. Data transmission between the BS/AP 109 and the Core Network 111 utilizes any appropriate communication means, such as wireless, cable, and fiber optic.

In addition to providing access to remote networks and allowing information to flow between the cellular network and the external PDNs 103, the Core Network 111 provides control of the air interface between the BS/AP 119 and the UEs 101. The Core Network 111 may also coordinate the BS/APs 109 to minimize interference within the network.

CBRS Networks

Recently, the US Federal Government finalized rules (Rule 96) that allow general access to an area of the frequency spectrum referred to as the Citizen's Broadband Radio Service (CBRS) that operates in a 150 MHz wide frequency range from 3.55 GHz to 3.7 GHz. The CBRS rules set forth detailed requirements for the devices that operate in a CBRS network and how they communicate. CBRS supports both LTE and 5G devices. Base stations within a CBRS network are termed "CBSDs", and UEs are termed End User Devices (EUDs). CBSDs are fixed Stations, or networks of such stations, that operate on a Priority Access or General Authorized Access basis in the Citizens Broadband Radio Service consistent with Title 47 CFR Part 96 of the United States Code of Federal Regulations (CFR).

The CBRS rules require that a Spectrum Access System (SAS) allocate spectrum to the CBSDs to avoid interference within the CBRS band. The SAS is a service, typically cloud-based, that manages the spectrum used in wireless communications of devices transmitting in the CBRS band, in order to prevent harmful interference to higher priority users such as the military and priority licensees. In some implementations multiple CBSDs are proxied to the SAS via a Domain Proxy that communicates with the SAS. All CBSDs require authorization from the SAS before starting to transmit in the CBRS band, and after authorization, the SAS may suspend or terminate one or more of the previously-authorized channels, which requires the CBRS devices to cease communicating on those channels with a set time frame. However, regardless of complexities introduced due to spectrum control, the CBRS band provides an opportunity to create new wireless networks, and there is a desire for utilizing and making optimum use of spectrum in the CBRS band while following the rules pertaining to CBRS usage.

Network Slicing

In mobile communication networks such as 4G LTE (LTE) and 5G NR (5G) networks, a greater efficiency and productivity of business communication processes can be achieved by tailoring connectivity and data processing to meet the specific requirements of the various applications run by the mobile devices. By tailoring connectivity and data processing to specific requirements, opportunities open up for service providers to address different business segments and enterprises more effectively.

For this purpose, network slicing was introduced for LTE/5G networks. In 5G, network slicing is a network architecture that enables the multiplexing of virtualized and independent logical networks on the same physical network infrastructure. Each network slice is an isolated end-to-end network tailored to fulfil diverse requirements requested by a particular application.

The GSM Association (GSMA) is a telecommunications industry group involved in 5G. A publication entitled "Network Slicing Use Case Requirements", dated Apr. 18, 2018, discusses network slicing. From a mobile operator's point of view, a network slice is an independent end-to-end logical network that runs on a shared physical infrastructure, capable of providing an agreed service quality. A network slice may span across multiple networks or multiple parts of the network (e.g. access network, core network and transport network) and can be deployed across multiple operators. Although a network slice may utilize dedicated and/or shared resources, (e.g. in terms of processing power, storage, and bandwidth), each network slice behaves as an independent network, and is effectively isolated from the other network slices.

Various technologies and innovations from different technical domains have substantially contributed to the advancement of Network Slicing in multiple Standards Developing Organizations (SDO). Currently, technical specifications for those different technical domains are defined in corresponding SDOs. For example, Radio Access Network (RAN) and Core Network (CN) are defined by 3GPP, Transport Network (TN) is defined by BBF, IETF, and others. ITUT (GSTR TN5G), IEEE (NGFI 1914), MEF and other SDOs are working on this topic as well. For example, the 3GPP ($3^{rd}$ Generation Partnership Project) TS 23.501 Release 16, v16.2.0 (2019 September) specification includes particular aspects of network slicing. Details are specified in 3GPP 23.501 section 5.15. The UE device may provide Network Slice Selection Assistance Information (NSSAI) parameters to the network to help the network select a RAN and a Core Network part of a Network Slice Instance (NSI) for the device. A single NSSAI may lead to the selection of several slices. The network may also use device capabilities, subscription information and local operator policies to do the selection. Network slices may differ for supported features and network functions optimizations, in which case such Network Slices may have e.g. different S-NSSAIs with different Slice/Service Types (SSTs) (see 3GPP TS 23.501 section 5.15.2.1).

The network may serve a single UE with one or more Network Slice instances simultaneously via a 5G Access Network (5G-AN) regardless of the access type(s) over which the UE is registered (e.g. 3GPP Access and/or Non-3Gpp (N3GPP Access). The Access and Mobility management Function (AMF) instance serving the UE logically belongs to each of the network slice instances serving the UE, i.e. this AMF instance is common to the Network Slice instances serving a UE.

Although the 5G standard discusses a basic architecture for network slicing, this basic architecture is limited and provides no particular mechanism for defining, configuring and administering network slices. Typically network slices as defined in the standards would be defined and administered by the large telecommunications companies that serve large numbers of customers, which would keep prices high, and reduce the pace of adoption by relatively smaller enterprises.

Accordingly, there is presently a desire for a network slicing mechanism for enterprise networks such as CBRS networks that can be easily implemented and administrated. Particularly it would be an advantage to simplify and automate the network slice configuration process, provide configurations tailored to particular enterprises, and simplify reconfiguration to provide appropriate levels of service to UE devices in a wireless network.

SUMMARY

Methods and apparatus are disclosed for autoconfiguring microslices in enterprise wireless communication networks.

A microslice, as used herein, is an independent end-to-end logical network that is implemented and runs on a shared physical infrastructure through the communication network. Microslices ensure that certain Quality of Service (QoS) and Service Level Objective (SLO) requirements are met for different service types or applications. Microslices allow greater customization of services and simplify administration for LTE/5G networks. Methods for seamless auto configuration of microslices for enterprise deployments are disclosed. The method and apparatus are useful in any wireless communication network; in one embodiment any of the enterprise networks may be configured to operate as a Citizen's Broadband Radio Service (CBRS) system, and the BS/APs comprise CBRS Devices (CBSDs) that are located at the enterprise location and form part of the enterprise network.

Various embodiments for autoconfiguring microslices in enterprise wireless communication networks are disclosed. The enterprise wireless networks are connected to a remote network orchestration platform, which includes server units, databases, machine learning and artificial intelligence units, and other electronic units that provide a variety of services for the enterprise networks, for example, administration services, data collection, data processing, and machine learning. A microslice knowledgebase unit is included in the orchestration unit to configure microslices for the enterprise networks based upon communication requirements of applications, devices, and groups of devices such as service type, bandwidth requirements. The microslice configuration unit in the knowledgebase may develop microslice templates based upon enterprise type, which can be used to better make recommendations to enterprise networks during initial deployment and afterwards.

The microslice knowledgebase receives operational data from the enterprise networks, and includes machine learning (ML) and artificial intelligence (AI) to learn the communication requirements of each enterprise deployment responsive to the operational data. The microslice configuration unit includes ML and AI that determines microslice configurations responsive to the communication requirements, and a microslice configuration library/repository unit that stores microslice configurations from the microslice configuration unit. The microslice configurations include applications, service type, bandwidth requirements, devices, and groups of devices, and may be stored in a microslice configuration library/repository unit holds templates for initial enterprise network deployment activities based upon enterprise type. The knowledgebase unit of claim may include a retraining unit including machine learning configured to receive continuing operational data from the enterprise networks, and responsive to the continuing operational data, to update the microslice configurations.

A method of autoconfiguring microslices is disclosed, including creating and using the knowledgebase for configuring microslices in an enterprise wireless network, including providing a plurality of inputs to the knowledgebase, including providing observed data inputs and deployment information inputs from a plurality of enterprise networks, including at least one of applications for operation in the enterprise network, devices for operation in the enterprise network, enterprise type, network configuration information; and microslice configurations, including service type and bandwidth. The inputs to the knowledgebase are examined to provide a list of applications, and then processed using machine learning and artificial intelligence techniques to associate similar enterprise types and at least one of the devices, applications, and microslices implemented in similar or related enterprises. A plurality of microslices are configured responsive to the inputs and associations, including associating a plurality of microslices with a single application; and the microslices are stored in a microslice repository in the knowledgebase. Some of the microslice configurations may be associated with an enterprise type and stored in the microslice repository as a template for the enterprise type. The microslice configurations may be associated various communication requirements and needs of the enterprise networks, such as applications, UE devices, and groups of UE devices. The method may define a plurality of groups of microslice configurations, each group associated with an application, or a device type, or a group of device types. A group of micro slice configurations may be supplied to a single application, or a single device or group of devices, so that if network conditions change, such as an overload condition occurs, alternate microslice configurations are available for use, and the communication session can be updated with a microslice appropriate to continue providing acceptable service to the UE device.

The enterprise networks may be monitored, and continuing operational data may be supplied to the microslice knowledgebase, which processes the operational data using machine learning and artificial intelligence techniques, may reconfigure the plurality of microslices responsive thereto.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 2C is a table showing an example device group definition, including Field Name, a Value Example for that field, and a Field Description for that field.

FIG. 2D is a table showing an example of microslice assignments to different device groups.

FIG. 2E is a table showing an example microslice definition in one embodiment.

The figures are not intended to be exhaustive nor to limit the claimed invention to the precise form disclosed. It should be understood that the disclosed method and apparatus can be practiced with modification and alteration, and that the invention should be limited only by the claims and the equivalents thereof.

DETAILED DESCRIPTION (1) 4G and 5G Communication Networks and Systems

Communication networks and system components are described herein using terminology and components common to 4G (LTE) communication systems, and/or 5G NR communication systems. However, the principles of the communication network and microslices described herein more widely apply to other communication systems, not only to 4G or 5G systems. Also, communication networks and system components are described herein using terminology and components relating to CBRS systems and their approved (registered) interfaces including 4G (LTE) (IEEE 802.16e), 5G NR 3GPP TS 38.300, E_UTRA (3GPP TS 36.300) communication systems. For instance, the term "CBSD" is one implementation of a Base Station/Access Point (BS/AP), and used herein for descriptive purposes in the context of a CBRS system. The principles of the communication network described herein more widely apply to other communication networks and systems.

(2) Enterprises and Enterprise Networks

An implementation of a microslice auto configuration system is described here in the context of an enterprise network. Although described in the context of an enterprise network, the principles disclosed can also apply to any private network and more generally public networks. An enterprise network is one type of private network. Private networks are operated for use within a limited area by a limited group of authorized users, whereas public networks generally cover a larger area and are open for use by anyone that subscribes to the service by the network operator. An enterprise network is created at an enterprise location such as a warehouse, factory, research center or other building, and is usually operated by an organization for its own use. Other types of private networks may be operated by a private network manager for use by more than one organization.

(3) Microslices

A microslice provides an independent end-to-end logical network that runs on a shared physical infrastructure. Microslices are used to provide communication paths that ensure certain Quality of Service (QoS) and Service Level Objective (SLO) requirements are met for different service types or applications. The communication paths through the network may be defined by a combination of the bearers available within the network. Advantageously, microslices allow greater customization of services and simplify administration for LTE/5G networks, facilitating greater adoption in private networks, and lower cost. This document discusses methods for seamless auto configuration of microslices, which is useful for LTE/5G deployments.

Figure 2A:
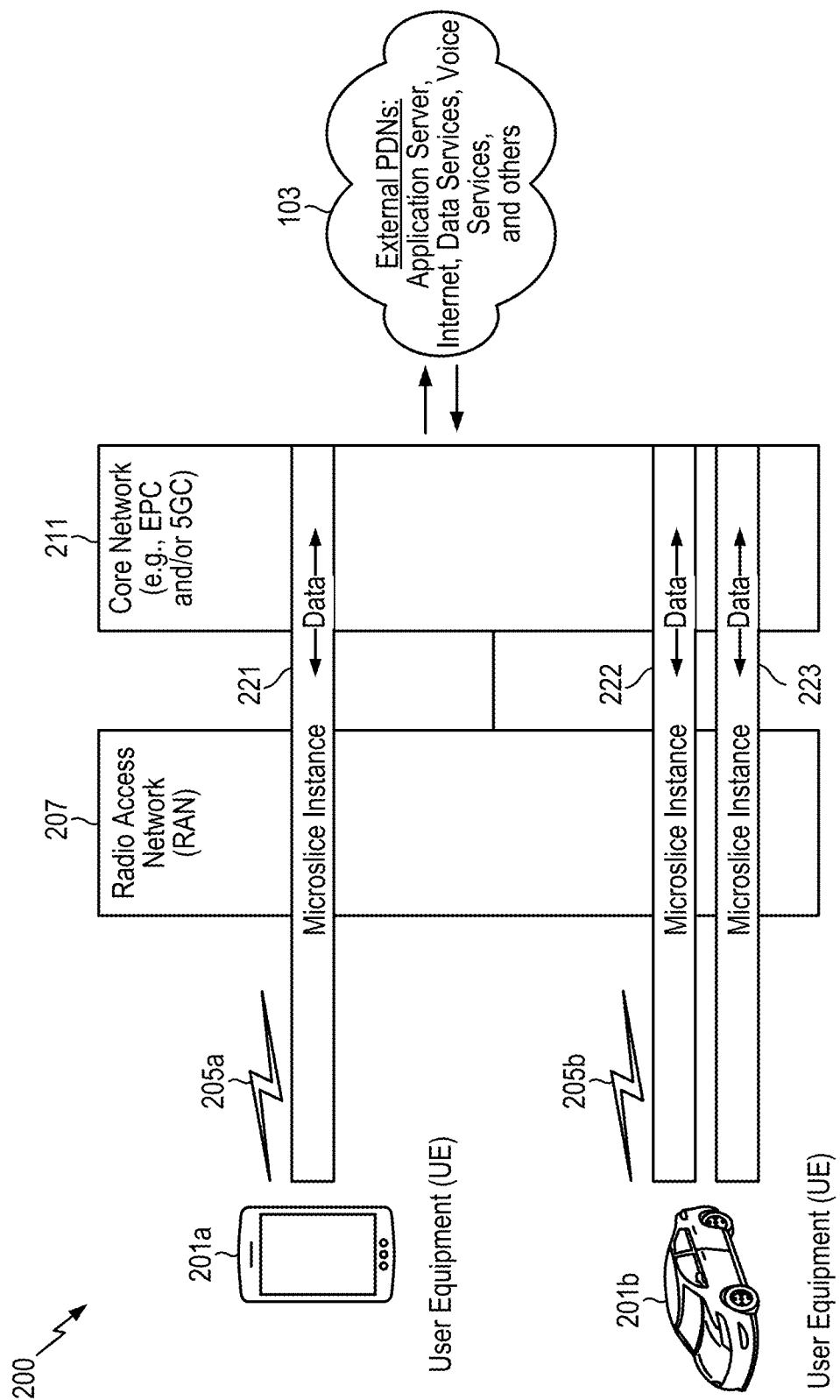
FIG. 2A is a block diagrams of a wireless communication network illustrating a plurality of microslices providing communication paths through the network.

FIG. 2A is a block diagram illustrating microslice instances in a wireless network 200. In FIG. 2A, a mobile phone UE 201a is connected via a wireless link 205a to a RAN 207, which is connected to Core Network 211. A vehicle 201b is connected via a wireless link 205b to the RAN 207. It should be apparent that the different devices, and even different functions in the UEs have different communication requirements. For example, the mobile phone UE 201a may have a need for voice communication. The vehicle 201b may need a highly reliable link for navigation, and another for data communication. To address these needs, microslices are described herein. A microslice defines the path of data flows to, and from, a device. A device may be a UE or other device such as an Access Point (AP), a router, or other component in the communication network. Although typically the microslice's data flow will travel end-to-end (i.e. from the UE to the edge of the external PDN), the data flow may travel through all or parts of the RAN, Core Network, and service platforms. A microslice can be defined in any of a number of ways; for example in some embodiments, a microslice may be defined to meet the requirements of a service type, in other embodiments, a microslice may be associated with an application, or a group of applications. Advantageously, a microslice can be defined by a network administrator operating one or more networks in an enterprise location, and the defined microslices can then be applied to communications within the enterprise location's networks.

In the network 200 each microslice is instantiated (i.e., established within a "microslice instance") in a manner that forms a complete logical network. A logical network is a virtual representation of a network that appears to the user as an entirely separate and self-contained network even though it might physically be only a portion of a larger network or a local area network. In FIG. 2A, a first microslice instance 221 is shown from the mobile phone UE 201a through the RAN 207 and to the Core Network 211. A second microslice instance 222 and a third microslice instance 223 are provided from the vehicle 201b through the RAN 207 and to the Core Network 211. An instance may also be established between other components of the communication network, such as in parts of the RAN and/or the Core Network, or between other components of the communication network. For example, an instance may be established between the UE 201a and the RAN 207, between the vehicle 201b and the RAN 207, or between the RAN 207 and the Core Network 211, or along any communication link (e.g. bearers, as will be described) that may be available.

Each microslice instance 221, 222, 223 is implemented using a set of network functions in the RAN 207 and/or Core Network 211. One example of a Core Network is an Evolved Packet Core (EPC) in an LTE/5G network. The LTE/5G network may be part of an enterprise IT network, or other network. FIG. 2A shows the microslice instances 221, 222, and 223 implemented across the UE 201a, the vehicle 201b, RAN 207, and Core Network 211. As LTE/5G networks are deployed in enterprises, the newly-deployed networks need to be integrated into the local area network (LAN), wide area network (WAN).

Figure 2B:
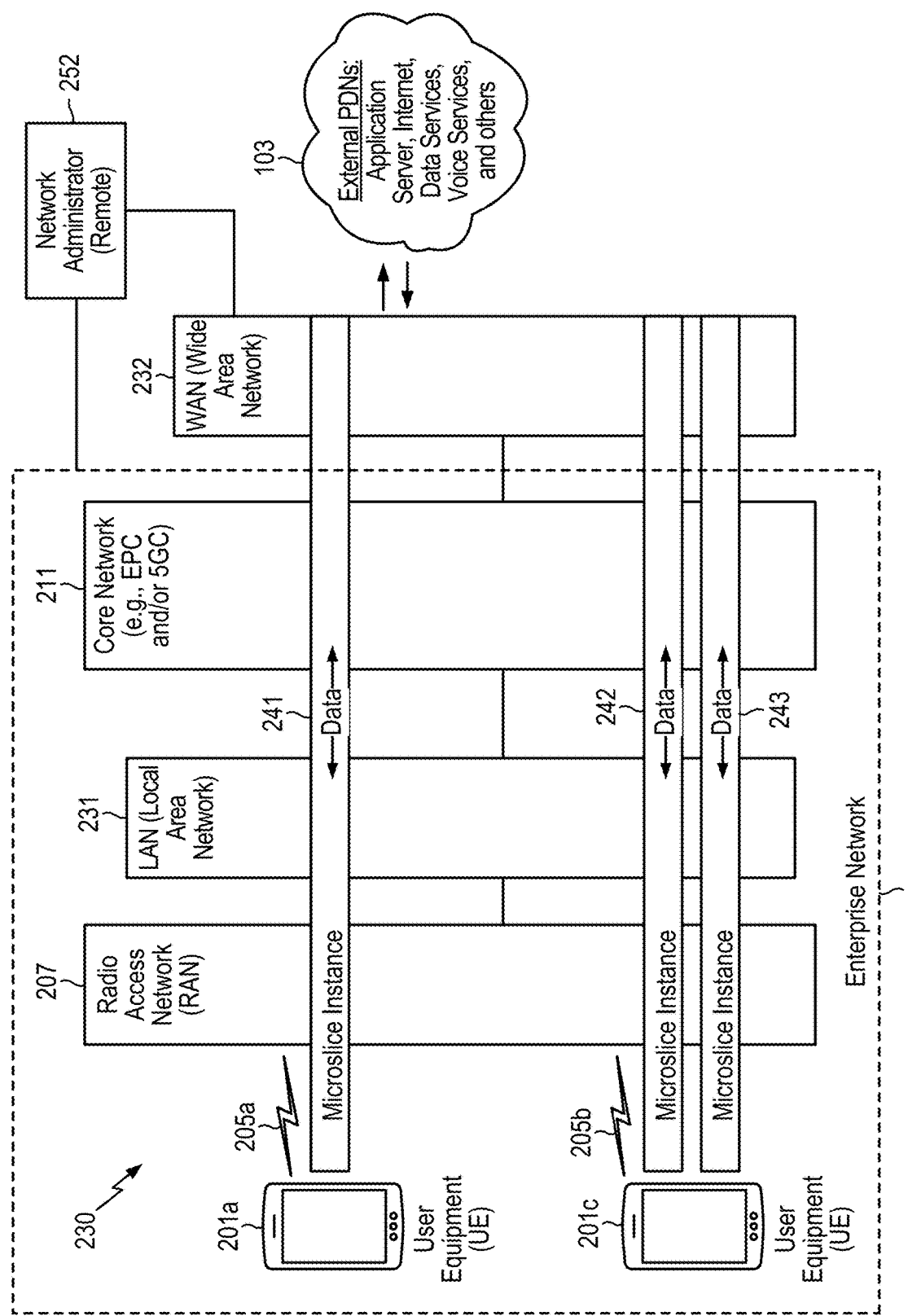
FIG. 2B is a block diagrams of a wireless communication network and an external WAN, illustrating a plurality of microslices providing communication paths through the network and the WAN.

FIG. 2B is a block diagram illustrating microslice instances across additional networks, including a Local Area Network (LAN) 231 and a Wide Area Network (WAN) 232. In FIG. 2B, the plurality of UEs 201a and 201c are wirelessly connected to the RAN 207. The Local Area Network (LAN) 231 connects the RAN 207 with the Core Network 211. The Wide Area Network (WAN) 232 is connected to the Core Network 211, and connects to a wide variety of external PDNs 103 and other services. These LANs and WANs may be external PDNs outside the Core Network 211. In many cases, firewalls (e.g., next-gen firewalls), may exist to protect the LANs and WANs. These firewalls would also be outside the Core Network 211. In FIG. 2B, the microslice instances extend from the UE, through the networks, and into the WAN 232. Particularly a first microslice instance 241 extends from the UE (mobile phone) 201a, through the RAN 207, LAN 231, Core Network 211, and extend into the WAN 232. The QoS parameters of each the microslices can be extended to these LANs, WANs and firewalls through standard mechanisms such as QoS markings and DiffServ differentiated services code point (DSCP). Similarly, second and third microslices 242 and 243 extend from the auto UE 201b, through the RAN 207, LAN 231, Core Network 211, and extend into the WAN 232.

In FIG. 2B, an enterprise network 250, shown within a block with dashed lines, includes the UEs 201, the RAN 207, LAN 231, and Core Network 211. Typically, these components will be at a common location, such as a building or other defined area, however some components may be outside the defined area. A network administrator 252 may, with appropriate security, remotely administer the enterprise network 250 via the WAN and set up microslices. Alternatively, the network administrator 252 may connect directly to the enterprise network, to administer the networks and set up microslices.

(4) Microslice Configuration

A single microslice configuration is defined by a number of parameters (or "components", as used herein) from which a microslice network path is implemented that meets the specified parameters. A microslice is an independent end-to-end logical network that is implemented and runs on a shared physical infrastructure through the communication network.

A microslice configuration may include the following components: 1) applications allowed, 2) service type, 3) bandwidth requirements, and 4) device/device group. Each component and some of its rules are discussed separately below.

Applications allowed: the application(s) that are to be mapped to the microslice's QoS configuration must be specified by the microslice.

Real-time application identification: In operation, an application can be identified by:
list of source/destination IP address ranges and ports.
Deep Packet Inspection (DPI) based methods such as nDPI Open and Extensible LGPLv3 Deep Packet Inspection Library, https://www.ntop.org/products/deeppacket-inspection/ndpi/, Cisco NBAR2 Cisco NBAR2 Protocol Library, https://www.cisco.com/c/en/us/products/collateral/ios-nx-os-software/network-basedapplication-recognition-nbar/product_bulletin_c25-627831.html and others. Deep packet inspection (DPI) is a type of data processing that inspects in detail the data being sent over a computer network, and usually takes action by blocking, re-routing, or logging the data accordingly.

AI-based methods that classify applications based on traffic features such as packet size, rate, inter packet arrival time etc.
Some combination of the above.
Type of service:
This parameter (component) denotes the type of service required for an application, similar to the service class in Diffserv architecture (ex: interactive video, real-time audio etc.), which has been used for many years to define service requirements. The type of service determines the QoS Class Identifier (QCI) (4G) or the QoS Identifier (5QI) (5G) that will be configured in LTE or 5G respectively. There are recommended mappings available (such as the IETF draft 'Diffserv to QCI Mapping' Diffserv to QCI Mapping, IETF Proposal, https://tools.ietf.org/id/draft-henry-tsvwgdiffserv-to-qci-03.html). Note that these mappings may also be customized for a specific deployment and/or customer.

The QCI/5QI class system provides bounds for packet loss, delay and priority. Some QCIs/5QIs require the bit rate to be specified as well (see below).

The QCI/5QI class system is very well standardized for the traditional IP world. However, for some uses it may not be granular enough, e.g., it doesn't distinguish between applications that have the same QCI/5QI, but may have very different requirements. For example, YouTube, Netflix, or Zoom might have the same QCI, but there are different performance requirements. It is important to configure the right QCI.

DSCP (Differentiated Services Code Points) markings, if used, should be consistently mapped to the same QCI/5QI and priority to ensure predictable configuration and QoS behavior. DSCP markings: The DSCP is a number in the range 0 . . . 63 that is placed into an IP packet to mark it according to the class of traffic it belongs in. Half of these values are earmarked for standardized services, and the other half of them are available for local definition. See https://tools.ietf.org/html/rfc8622.

Bandwidth requirements:

Each microslice may be configured with a Guaranteed Bit Rate (GBR) setting based on the application(s) it supports. Bandwidth requirements will likely vary for each app associated with the microslice.

We want to learn and configure the microslice to the bandwidth requirements of each application.

Device and device group association: to simplify administration and implementation of microslices, some embodiments may include device groups that may be utilized by a network administrator to simplify administration. In these embodiments the microslice may include the list of devices/groups for which the microslice is enabled. A device could determine the set of applications (ex: IP camera, IoT sensor) and therefore by that route determine the microslice configuration(s) required. The list of devices, device groups therefore influence the final set of microslices required for a deployment; i.e., if the devices are known then one may be able to infer the applications that might be running, and provision the microslice accordingly. Device groups are another way to make sure that the set of devices get consistent treatment across the network.

A device group can be assigned to one or multiple microslices. Examples of devices that might be assigned to one or more different device groups can include devices such as:
Smart Phones,
Security
Streaming
IP Camera,
Video conference,
Default,
Tablets,
Handheld Mobile Devices,
Point of Sale (POS) terminals, and
Routers/access points for backhaul.

A device group can be defined with specific information such as device group name, administrator name, a trusted/untrusted field, VLAN or VxLAN ID and DHCP server address. FIG. 2C shows an example device group definition, including Field Name, a Value Example for that field, and a Field Description for that field. In FIG. 2C, the Field Names specific to this example include: Device group name, Admin, Trusted, VLAN or VxLAN ID, and DHCP.

Mobile devices (UEs) in an enterprise can be assigned to a device group, which may include many mobile UEs, but in some embodiments, a particular UE can be assigned to only one group. FIG. 2D is a table showing an example of how microslices can be assigned to different device groups. For example, FIG. 2D shows that Device Group 1 is assigned to the microslice called "Streaming", to the microslice called "Video Conf" and to the "Default" microslice. In addition to a device group being assigned to more than one microslice, it is likely that more than one device group will be assigned to one or more of the same microslices depending on the needs of the enterprise. If multiple microslices are enabled for a device group, some or all of the applications running on a device within the device group may be assigned to a particular one of the enabled microslices.

FIG. 2E shows an example microslice definition in one embodiment. In this example the microslice is defined by parameters that reside within fields. The parameters may, for example, include name, allowed application definitions, minimum guaranteed throughput, maximum allowed throughput, maximum packet delay bound, maximum packet loss rate and priority.

(5) Microslice Knowledgebase

In order to recommend microslices appropriate for a particular application, and implement the microslice configuration for each application, for each device, and to develop the microslice configurations that will be implemented in a particular deployment, data is collected (e.g. from current deployments), processed, and stored in a useful way. Particularly a knowledgebase is disclosed herein to receive data that may be gleaned from multiple deployments. (i.e. it must be done by the orchestrator).

Generally, microslice configuration as described herein requires knowledge needed to inform optimal choices for each of the microslice components discussed above. This can be achieved by building a knowledge repository for the different configuration components, and then providing data-driven suggestions to enhance manual configuration or completely automating the configuration process. Building a knowledge repository implies collecting relevant data from deployments and curating the data into knowledge over time. This requires an automated infrastructure for data collection and curation. (See Figure) The knowledge can be proprietary to the LTE/5G provider and may also be offered as a service to end customers.

Figure 3A:
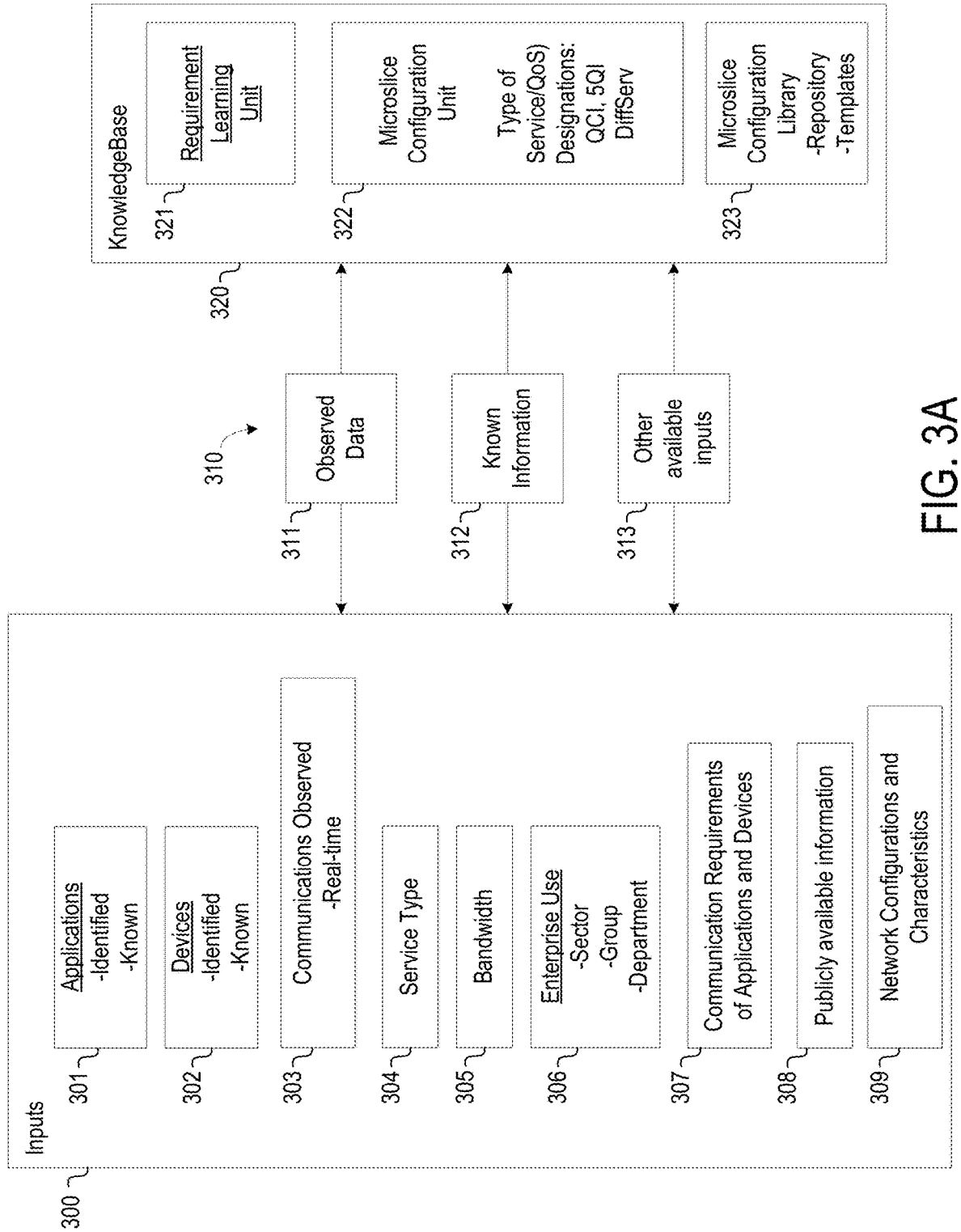
FIG. 3A is a block diagram illustrating inputs and data flows into a microslice configuration knowledgebase.

FIG. 3A is a block diagram illustrating inputs 300 and input data flows 310 into a knowledgebase 320. Particularly the inputs 300 in this implementation include the following; in other implementations, other inputs may be included and used.

Application inputs 301, including information related to the application, which may be identified by observation, known to exist, supplied by enterprise administrator, or identified any other way.

Device inputs 302, which may include information regarding particular devices, groups of devices, and types of devices. The device inputs may be associated for example with applications and/or enterprise types.

Observed communications 303, which may include logs, summaries or other information regarding communications monitored and observed real-time throughout the network. The observed communications may be associated with applications and devices.

Service type 304, which indicates the level of service expected for a microslice instance, and may be in any appropriate designation or format such as QoS Class Identifier (QCI) in LTE, QoS Identifier (QI) in 5G, DiffServ (which can be mapped to a QCI or QI). The service type data may be associated with applications and/or devices.

Bandwidth (BW) 305 which indicates the actual BW used by an application or similar applications, or devices, as monitored and observed over time. The BW allocated to the application or device may also be provided.

Enterprise, business and use-related inputs 306, which may be based upon and include the business sector of enterprise, the type (expected use) of deployment (e.g. office, laboratory, factory floor), the business department, or group or division using the network.

Communication requirements 307 of applications and devices identified or known, supplied from any suitable source, such as publicly available product specifications, or the application or device itself, or the network administrator.

Publicly available information 308: Any other publicly known information such as may be available on the internet or other communication networks may also be provided and used and an input.

The above is representative of the inputs useful to configure microslices as described herein; in other implementations, other inputs may be utilized.

The input data flows 310 to the knowledgebase 320, for purposes of description, may be grouped into observed data 311, known information 312, and other available inputs 313.

(6) Knowledgebase Inputs

The method of microslice configuration as described herein requires knowledge that informs the configuration choices. The knowledge can provide optimal choices for each of the microslice components. Access to this knowledge can be achieved by utilizing a knowledgebase to create a knowledge repository for the different configuration components, and then providing data-driven suggestions. These suggestions, or recommendations, can be used various ways such as to enhance manual configuration or even completely automate the configuration process. Building a knowledge repository implies collecting relevant data from deployments and curating the data into knowledge over time. In one definition, a knowledgebase is a computer system that systematically captures, organizes, and categorizes knowledge-based information to provide answers to questions or solutions to problems, enabling rapid search, retrieval, and reuse. A knowledgebase collects and organizes a great deal of information into a useful form, storing it in knowledge repositories, managing and updating the information, and delivering it appropriately to answer questions and provide recommendations and solutions. As used herein, the knowledgebase is used to populate the knowledge repositories that store the information required for auto configuration.

As shown in FIG. 3A, the knowledgebase unit 320 receives a number of inputs. The data collection and other processes that provide these inputs utilize any appropriate methodology to monitor and collect the data, and therefore, the inputs can have a variety of forms and formats. The knowledgebase unit 320 receiving these inputs includes systems having the capability to determine the data's format and process the received inputs accordingly. Particularly, the knowledgebase unit 320 includes a requirement learning unit 321 that includes machine learning (ML) and artificial intelligence (AI) that learns the requirements of a particular enterprise deployment, and a microslice configuration unit 322, also including ML and AI that determines microslice configurations as may be useful, for example for a particular enterprise, application, device, or device group. The resulting microslice configurations can be stored in a microslice configuration library/repository unit 323, which can hold templates that can be used for initial deployment activities.

Figure 3B:
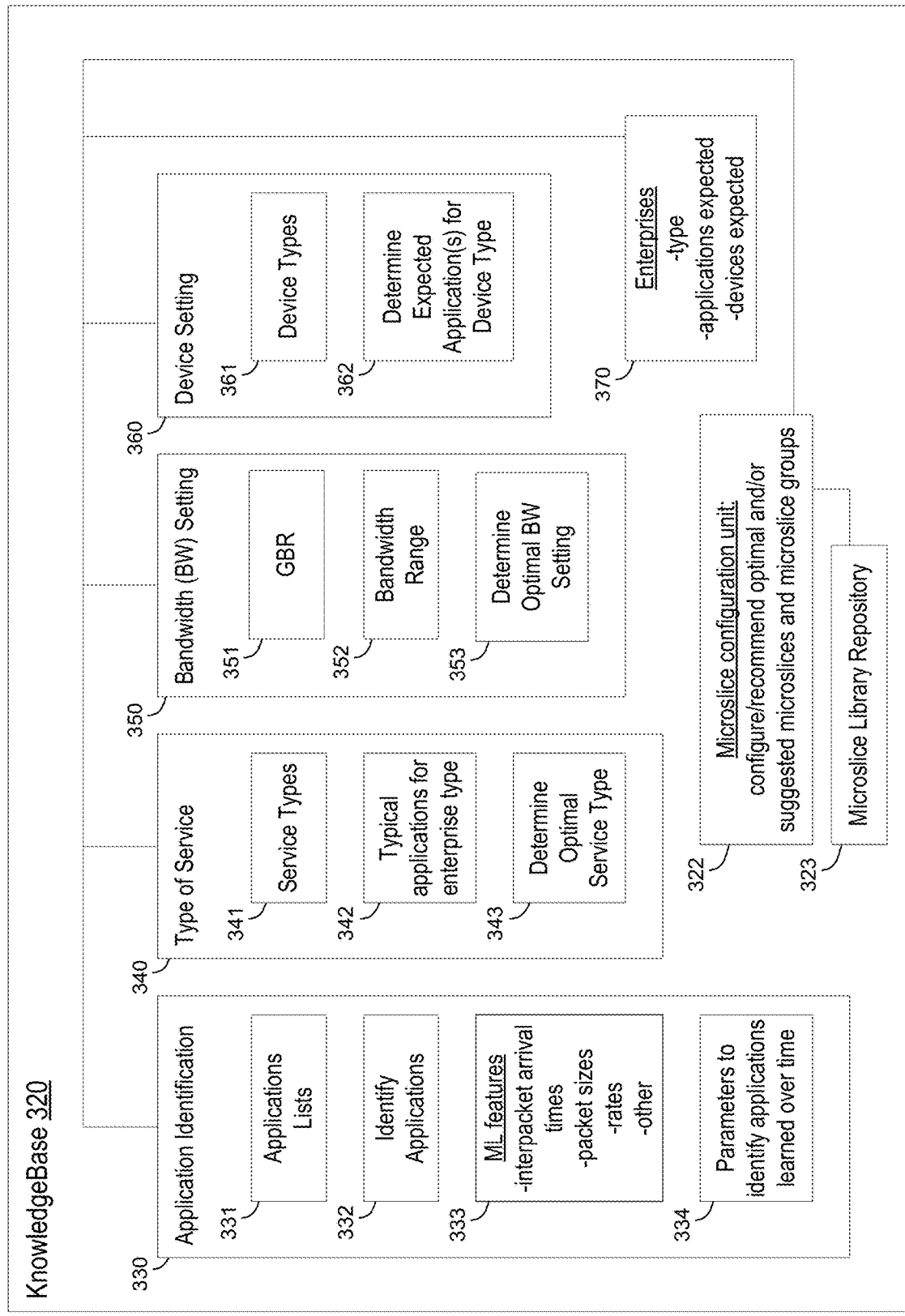
FIG. 3B is a block diagram of one embodiment of the microslice configuration knowledgebase.

FIG. 3B is a block diagram of one embodiment of the microslice configuration knowledgebase 320 that, for purposes of description, includes an application identification section 330, a service type section 340, a bandwidth setting section 350, a device setting section 360, and an enterprises section 370, all of which are interconnected in the knowledgebase 320.

The application identification section 330 includes application lists 331, an application identification unit 332, a machine learning unit 333, and a list of parameters 334 to identify applications learned over time, all of which are communicatively interconnected.

The application lists 331 include lists of applications observed operating in an enterprise deployment, or known to exist in that enterprise deployment. The inventors have recognized that the lists of applications for a particular enterprise often vary depending on business/deployment sectors such as retail, IoT, healthcare, which provides the opportunity to classify and/or train the knowledgebase by business/deployment sectors, or using sector expectations, and therefore these lists may include associations between applications and business and use-related information such as business sectors.

The application identification unit 332 includes systems that may be DPI-based ("Deep Packet Inspection") to help identify applications from the observed data it receives. The machine learning unit 333 includes features may also use DPI-based rules, and/or relevant Machine Learning ("ML") features, to allow real-time application identification while the enterprise deployment is operating. Example ML features include inter-packet arrival times, packet sizes, rates, and others. Parameters lists 334 for these DPI and ML rules can be learned over time by e.g. observation. One use is to provide recommendations and direction that can automatically select and configure the microslices in new and existing deployments.

The type of service section 340 includes interconnected service type lists 341, lists of typical applications and service types by enterprise type 342, and an optimal service type unit 343 that can determine the optimal service type based on the application and other known information. The service type lists 341 include lists of known service types such as QCI (in 4G), QI (in 5G), DiffServ, and mappings between them. The typical applications and service type lists 342 include service types and applications typical for an enterprise type. For example, application A is used by a large retail customer, and based upon the enterprise and other information learned over time, an assumption can be made regarding the type of application this is: e.g. is this a conferencing app, or an IP camera? Knowledge learned over time in the knowledgebase 320 is used to help make these lists. The optimal service type unit 343 includes lists of applications for a particular service type, and a way to make recommendations and choose an optimal service type for a particular microslice.

The bandwidth (BS) setting unit includes a guaranteed bit rate (GBR) unit 351, a bandwidth range unit 352, and an optimal BW unit 343 that can determine the optimal bandwidth based on the application and other known information. The GBR unit 351 includes a lists and information that associate an application or device with a GBR. Utilizing the GBR setting and other information such as spectrum availability, the bandwidth range unit 352 associates ranges with the application or device, and the optimal BW setting unit 353 can map the application to its optimal bandwidth range. The optimal BW setting allocated to an application is learned over time by observing the actual BW used by the application or similar applications. The optimal BW is somewhere between a BW that is too low and one that is too high. For example, if the application is observed to not be receiving appropriate service, then the allocated BW is too low, on the other hand if a large portion of the allocated BW is not being utilized, then the BW is too high and BW is being wasted that may be better re-allocated elsewhere.

The device setting unit 360 includes lists of device types 361 some of which may associate a device or device groups with one or more applications, and a determination unit 362 that determines the expected applications for the device type. The determination unit may associate the device type and applications expected for that device type in light of the enterprise type; e.g. if it is a hospital enterprise, then you know the device groups, e.g. medical imaging and security cameras will belong a different microslice.

The enterprise unit 370 includes lists and other information regarding enterprises such as the type of enterprise, the expected applications by enterprise, and the devices expected to be used by the enterprise. The enterprises unit 370 is connected to share information with any or all of the other sections and units in the knowledgebase 320.

The knowledgebase 320 also includes the microslice configuration unit 322 that is connected to all other sections and units in the knowledgebase. The microslice configuration unit receives all relevant information about a deployment, such as application, device type, bandwidth requirement, and type of service, examines the knowledgebase to find related deployments, and related information such as applications and device types, and based on that determines optimal and/or recommended microslice configurations for the deployment. The microslice library/repository 323 provides a place to store microslice configurations and templates and related information such as enterprise type. The microslice configurations may be stored individually or as groups.

In summary, the knowledgebase 320 observes enterprise networks, monitors communication activity, stores the resulting data, and examines information regarding the devices, applications, and microslices implemented in similar or related enterprises. It then develops systems in the knowledgebase that make recommendations and improve predictions regarding microslices that a deployment will need.

(7) Knowledgebase Flow Diagram

Figure 3C:
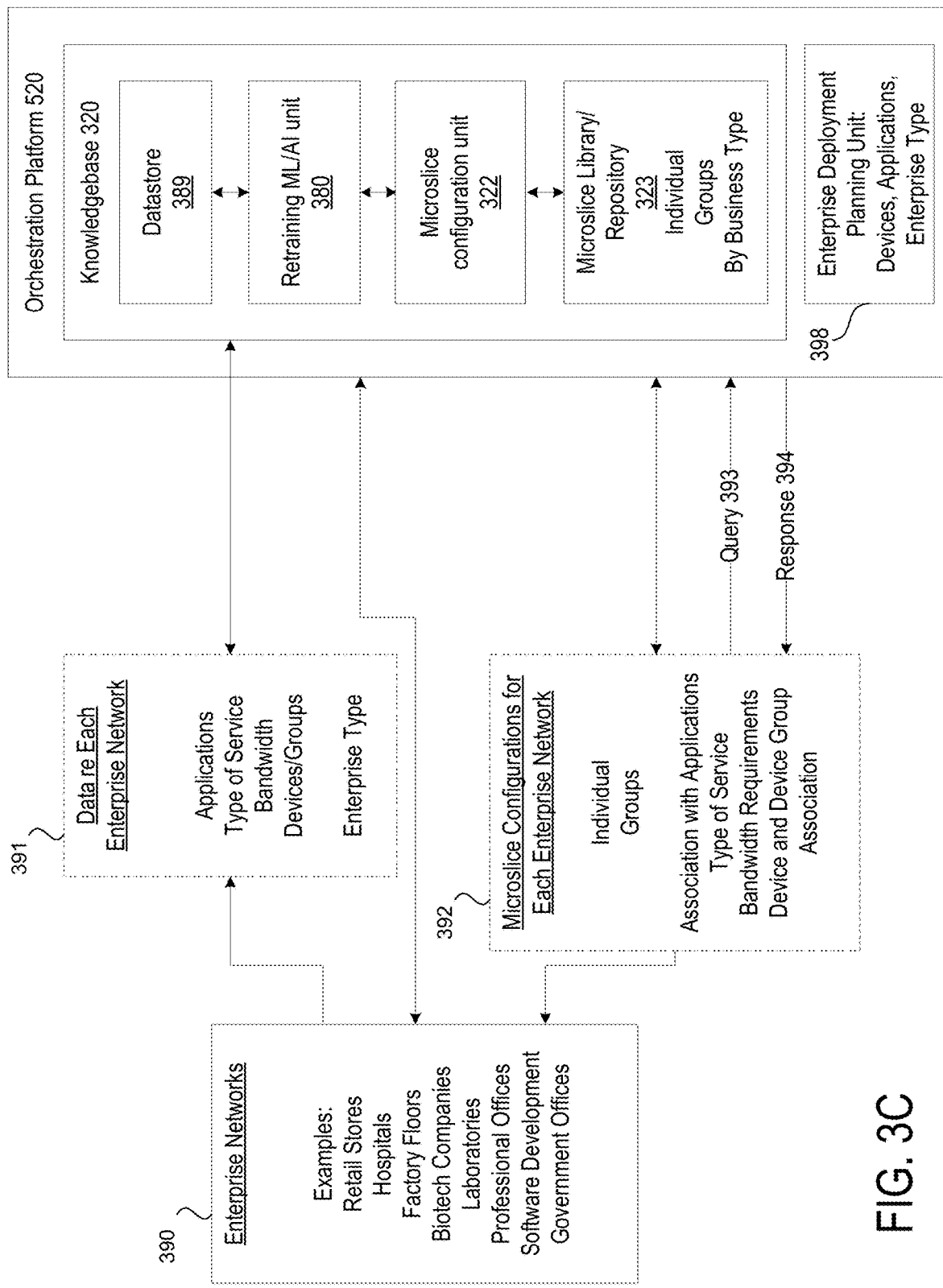
FIG. 3C is a flow diagram showing operations that utilize the knowledgebase to provide microslice recommendations and configure microslices for enterprise networks.

FIG. 3C is a flow diagram that shows operations utilizing the knowledgebase to provide microslice recommendations and configure microslices for enterprise networks. The enterprise networks 390 may be deployed in many different locations with many different uses: retail stores, hospitals, factory floors, biotech companies, laboratories, professional offices, software development companies, and government offices, to provide just a few examples.

The enterprise networks 390 are connected to an Orchestration Platform 520 (see FIG. 5), typically via a Packet Data Network (PDN) or any other suitable communication system. The Orchestration Platform 520, which may also be called a "Centralized Provider Network", is located remotely from the enterprise networks 390. The Orchestration Platform 520 includes appropriate server units, databases, machine learning and artificial intelligence units, and other electronic units that provide a variety of services for the enterprise networks 390, for example, administration, data collection, data processing, and machine learning. In this embodiment, the knowledgebase unit 320 is part of the Orchestration Platform 520.

The enterprise networks 390, provide data 391 regarding each enterprise network to the knowledgebase 320. The data 391 includes information regarding network operations such as the applications in use, the type of services supplied, bandwidth utilized and devices/groups of devices being operated, network usage, and enterprise type. The data 391 may be supplied at regular intervals, on demand, or intermittently.

The data 391 is provided to a datastore 389 in the knowledgebase 320 which will be utilized to update and improve the information stored therein. Particularly machine learning/artificial intelligence 380 in the knowledge base unit 320 may be utilized in conjunction with, or as part of, the microslice configuration unit 322 to update and improve the microslice library/repository configuration lists 323, utilizing the additional data. The updated microslice configurations can then be made available (392) to each enterprise network 390, by for example an enterprise deployment planning unit 398, which can direct any of the operations shown in FIG. 4A. Updated microslice configurations may be supplied upon request of an enterprise, as shown by the query 393, and provided in a response 394 from the knowledgebase 320. Alternatively, the updated microslice configurations may be provided as available, or on a predetermined schedule. Once supplied to the enterprise administrator, the updated microslice configurations may then be implemented in the corresponding enterprise network(s) 390.

(8) Configuring Microslices for a Deployment.

Configuring a set of microslices for a deployment is a typical activity performed on Day 1: i.e., the first day of operation of a new network, or the first day of a major upgrade of an existing network. As will be described, given a set of device groups/applications in the deployment, this activity "automatically" creates a set of microslice configurations that may be useful or necessary for efficient network operation. The automatically-created set of microslice configurations can also be used as initial "suggested" configurations for "tuning" microslices to improve performance; i.e., the "suggested" configuration can be used as a starting point for manual tuning. For the whole enterprise, it is advantageous that the microslices are configured and set up on Day 1, so that when network operation commences, the packets traveling through the network map themselves to the appropriate micro slices.

Post Day 1, new microslices may have to be added or existing ones re-configured for a number of reasons, for example as part of tuning the initial deployment, and over a longer time period, to facilitate product updates, changes in practices and standards, adding new features, and installing upgrades and improvements. For example, a sub-optimal GBR microslice setting may need to be reconfigured to increase the GBR; as another example, admission/load control issues while setting up bearers for UEs may trigger a scenario in which a low QoS microslice is assigned to an application that requires a higher QoS, therefore requiring the microslice to be reconfigured.

Figure 4A:
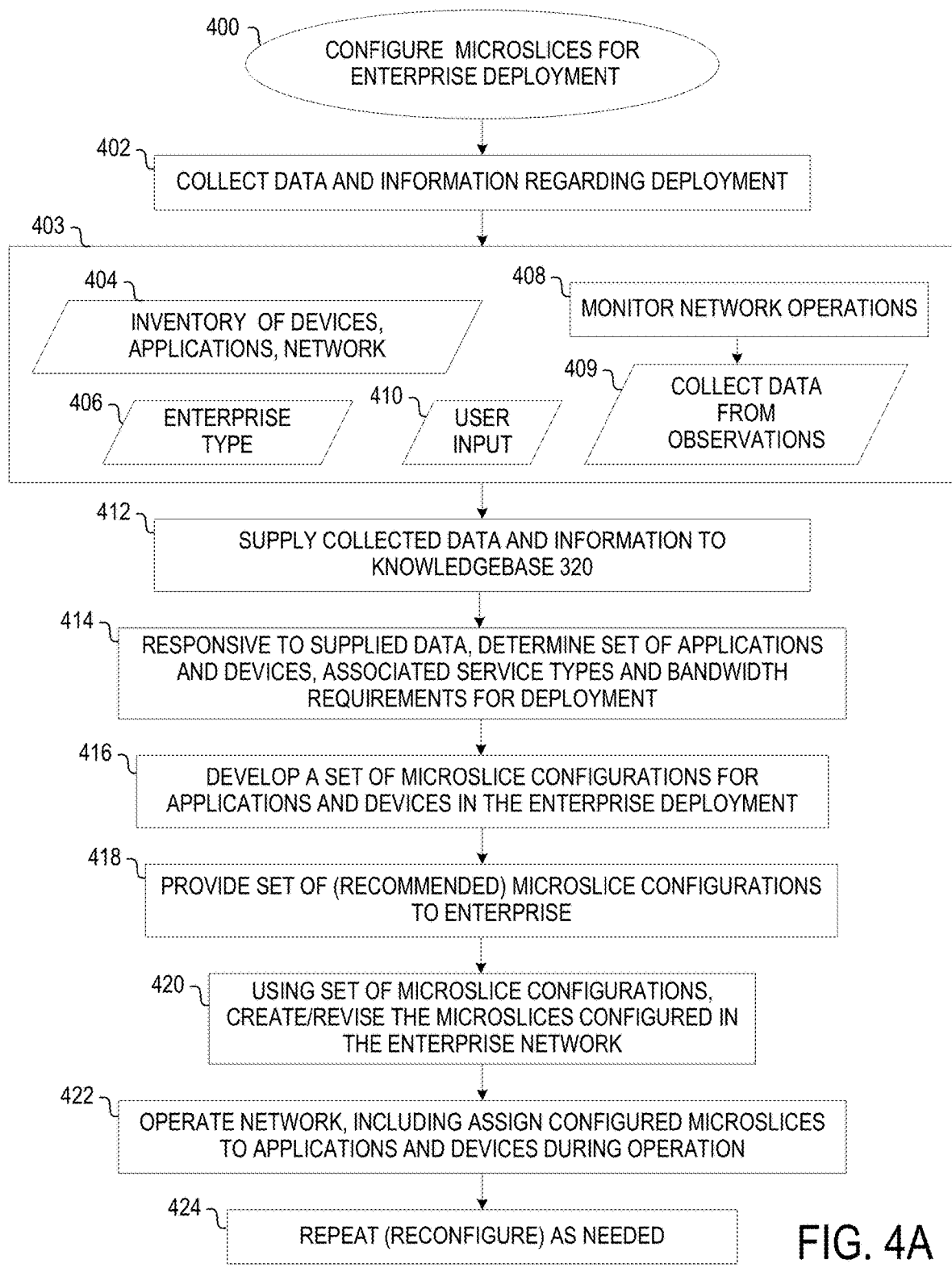
FIG. 4A is a flow chart illustrating operations to configure a set of microslices for an enterprise deployment.

FIG. 4A is a flow chart illustrating operations to configure a set of microslices for an enterprise deployment. Automatic configuration may be triggered for a number of reasons, for example configuration may be triggered during initial setup (Day 1) or as part of ongoing re-configuration of the microslices as part of the operations phase. Any or all of these operations may be performed in the Enterprise Deployment Planning Unit 398 (FIG. 3C).

After operations for configuration begin (STEP 400), data and other information is collected regarding the deployment (STEP 402). The data and other information (STEP 403) may be collected in any of a number of ways as will be described, the purpose of which is to determine a set of applications that the knowledgebase can use to configure microslices, and to supply other information such as devices and device groups, bandwidth, and service type which provides a further basis for configuring a set of microslices for the deployment.

If some of the devices and applications that will be used by the enterprise are known by the enterprise, an administrator or others, then an inventory (STEP 404) of these devices and applications can be made and supplied as one useful type of data. The specifications for these devices and applications may be already stored in the knowledgebase, and if not, their specifications are likely to be readily available and can be consulted to provide useful information regarding the requirements for these devices and applications. Also, other information about the network may also be useful in defining microslices; for example in a CBRS network deployment, the spectrum is discontinuous, and channels may be suspended or terminated, which may influence the set of microslice configurations; for example a CBRS network may require more flexibility and a set of alternative microslices that can be available if one of the channels is suddenly terminated or suspended.

If any enterprise information is known, then this information can be supplied (STEP 406) and is useful to suggest the types of microslices that may be needed, or at least narrow the likely possibilities. For example, in a hospital deployment if the knowledgebase has been trained by other hospital deployments, it can provide useful suggestions for device groups and expected applications, and suggest microslices that need to be configured. However, note that even with good initial suggestions of microslices, at least some re-configuration will almost certainly be needed to accommodate customized devices or customer-specific situations and equipment, or other unexpected or unusual arrangements. Enterprise information can include any business- and use-related information such as the business sector of enterprise, the expected use within the particular deployment, the business department, or group or division using the network.

In this type of data collection, network operations are monitored (STEP 408), and the resulting observed data is collected (STEP 409) In one example of monitoring the network and observing data, an 'agent' is run in observe (read only) mode in the network for N weeks. The agent gathers packet traces and/or observes applications running in the network, providing observed data. In one embodiment the agent can be installed on a router in the network, observing communications through the router.

In some implementations, a user such as a network administrator selects particular devices or applications for reconfiguration over a user interface (STEP 410). In an example of configuring microslice(s) for a single application, (i) the user can select a device or a device group, which in turn determines a set of applications or (ii) the user selects a specific application from a list/drop down menu for a specific enterprise type.

The data and other information collected in STEP 403 is then supplied (STEP 412) to the knowledgebase 320 (FIGS. 3A, 3B, 3C)

The data and other information supplied to the knowledgebase 320 is then utilized (STEP 414) by the knowledgebase 320 to provide a set of applications based on the deployment's needs—edit apps etc.—that will be used to develop a set of microslices for the deployment.

The set of applications provided in the previous step 414 is then utilized to develop a set a microslices for the deployment. Particularly, one or more microslices are configured for each application. The microslice configurations may be determined on an application-by-application basis.

For a given application, the configuration steps that may be automated (at least to a coarse level in the knowledgebase) include 1) the service type (e.g. QCI/5QI) setting, and 2) the GBR setting. It may be useful to check to see if the network can support this particular microslice configuration; for example, check to determine if the network has enough resources to handle the overall GBR and QCI/5QI characteristics based on the trend over last N days. This requires a 'what if' analysis that can be supported using ML-based methods. Based on the result of this "what if" analysis, alternate configuration suggestions may be made, for example via modifying the GBR or selecting a different QCI/55QI, which essentially changes the QoS level for the microslice(s) assigned to the application. It may also be useful to determine whether or not a microslice configuration having the same or similar configuration (e.g. same QCI/5QI) exists already. If not, then a new microslice configuration can be created with the new QCI/5QI and GBR setting. If yes, one already exists, then the existing microslice may be reconfigured; e.g., the GBR for the existing microslice may be reconfigured to accommodate the new application.

A set of microslices may be configured for a single application or a single device group. One advantage of having a set of microslices for an application is that the multiple microslices provide alternatives that can be utilized if the network can't support a particular QoS at a particular time. More generally, depending upon network limitations over time during operation, the network may not be able to support the best microslice for the application, and therefore the network may require the application to downgrade to a different lower quality microslice with different a QoS, so that other devices/apps, possibly with higher priority, can meet their QoS. In other words, multiple microslices can be set up for a single application, each with a different QoS, which can be used for the single application when the network is unable to support a higher QoS due to other demands or just being overloaded.

Furthermore, configuring multiple microslices with varying QoS levels for the same application (e.g. different GBR, QCI/5QI) may be useful to facilitate reconfiguration in other circumstances, such as in CBRS networks after a channel is suspended or terminated and the network may be reconfigured.

In some embodiments the knowledge base may include a repository mapping microslice configurations as templates based on an enterprise deployment type, size etc. These microslice templates can be used to recommend an initial configuration and then can be modified based on additional data and information.

The one or more sets of microslices determined in the previous step may then supplied (STEP 418) to the enterprise, or to the enterprise's network administrator, or others who may implement the sets of microslice configurations.

The sets of microslice configurations supplied can now be implemented (STEP 420) as microslices in the network. Implementing the set of microslice configurations may involve configuring new microslices within the enterprise network, or revising currently existing microslices.

The sets of microslice configurations can be implemented "as is", or they may be modified or tuned. For example, a network administrator, looking at the set of microslices and the related applications may revise the configurations with further revisions (may be called "tunings") that can be done either manually or automatic, and implemented over the previous configuration.

After microslices have been implemented in the network, operation of the network (STEP 422) can be started (or resumed) as appropriate. During operation, packets associated with applications are now assigned a microslice associated with that application, in accordance with information in the microslices configuration, for communication. The packets associated with that application are then communicated via the respective microslice to which it is assigned.

The configuration process of FIG. 4A may now be repeated (STEP 424). New microslices may need to be added, or existing micro slices re-configured for a number of reasons, for example to improve performance, and/or to provide a better user experience. In that instance the microslice configuration steps of this FIG. 4A may be repeated. Reconfiguration may be useful or necessary for a number of reasons, for example as part of tuning, to facilitate product updates, changes in practices and standards, add new features, and install upgrades and improvements. For example, a sub-optimal GBR microslice setting may need to be reconfigured to increase the GBR; as another example, admission/load control issues while setting up bearers for UEs may trigger a scenario in which a low QoS microslice is assigned to an application that requires a higher QoS, therefore requiring the microslice to be reconfigured.

(9) Network Implementation

Figure 1:
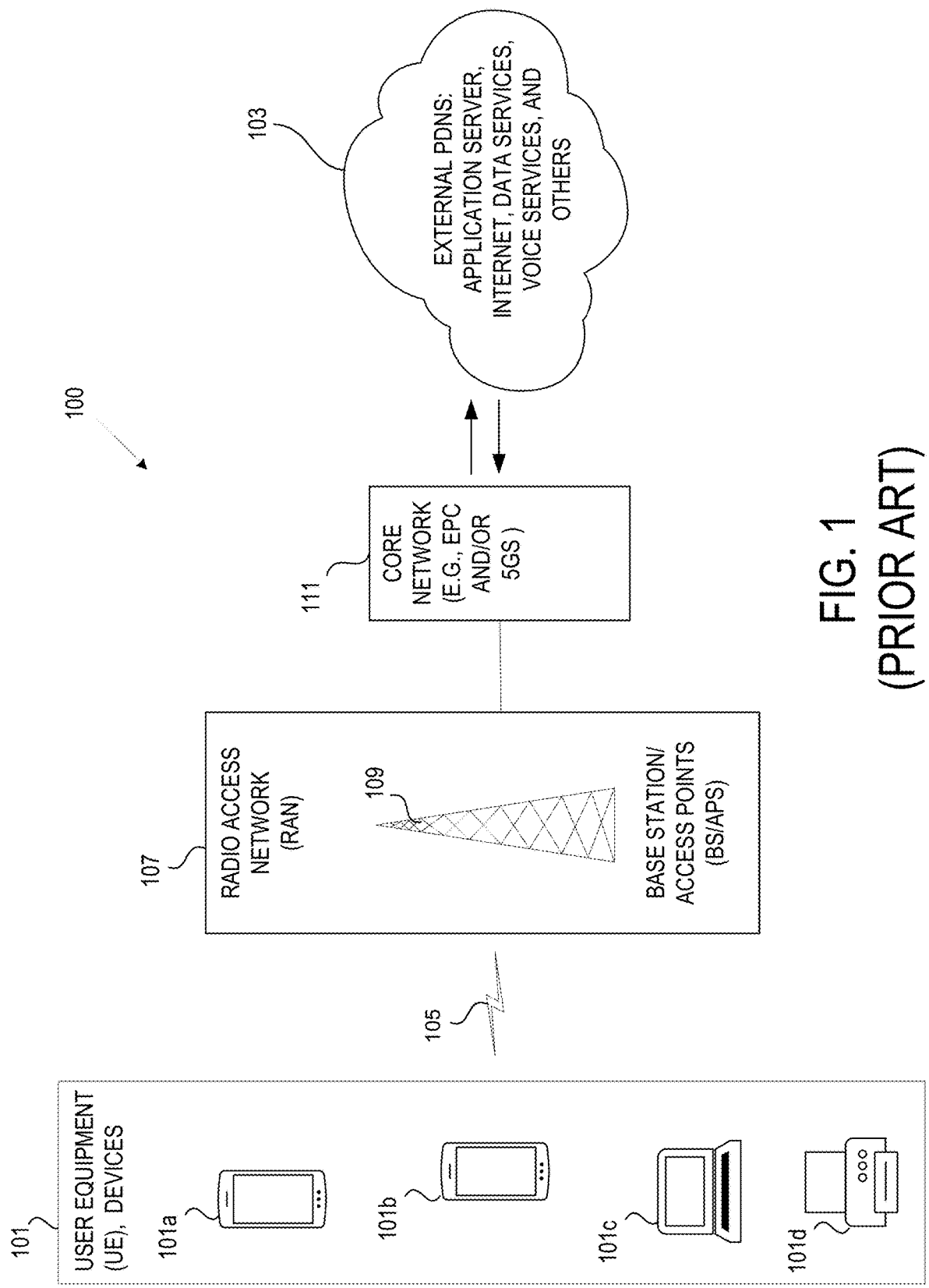
FIG. 1 is an illustration of a basic configuration for a wireless communication network, such as a "4G LTE" (fourth generation Long-Term Evolution) or "5G NR" (fifth generation New Radio) network.
Figure 5:
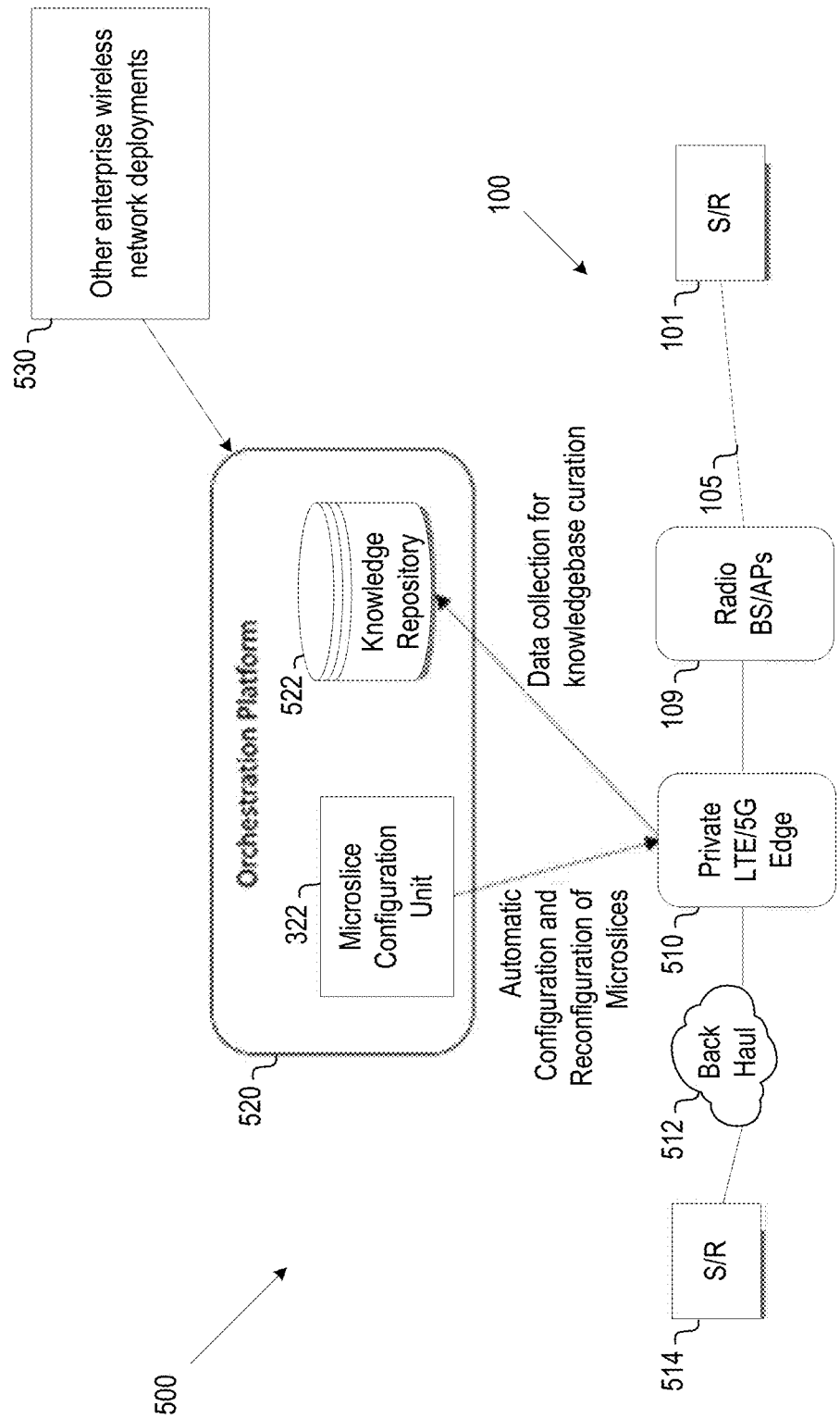
FIG. 5 is a block diagram of a one embodiment of a wireless communication system that implements a microslice configuration knowledgebase.

FIG. 5 is a block diagram of a wireless communication system that implements a knowledgebase 320 as described herein, illustrating an interaction between the network deployment and the microslice knowledgebase unit in the orchestration platform 520. Many of the components are described elsewhere in this application in more detail. The wireless network 100 includes UEs 101 (illustrated by an S/R block) that are connected via a radio link 105 to an access point 109 (in the RAN 107). The access point 109 is connected to a Private LTE Edge 510, which has similar functions as the Core Network 111, and is configured to communicate with an Orchestration Platform 520. The Private LTE Edge 510 is configured to allow remote administration and configuration by the Orchestration Platform 520. The Private LTE Edge 510 is also connected via a backhaul 512 to other (S/R) networks 514 such as the external PDNs 103 (FIG. 1).

The Orchestration Platform 520 includes a plurality of components and functions to support and administer the wireless network 100. The knowledgebase unit 320 resides in the Orchestration Platform 520, and includes the Microslice Configuration Unit 322, and a knowledge repository 522 that includes a number of the functions and databases shown in the knowledgebase diagram of FIG. 3B. The Orchestration Platform 520 is connected to receive data and information from multiple other enterprise deployments 530 for collection and processing.

The process of configuring microslices is performed in the centralized Microslice Configuration Unit 322 where there is visibility and access to all data and knowledge accumulated from the enterprise networks and elsewhere. Each enterprise deployment includes an edge that monitors data, which is sent to the central Orchestration Platform 520. Each enterprise deployment's edge is able to be configured remotely so that, through the cloud, the centralized Orchestration Platform 520 can configure the edge 510 (and it can also configure the edges in the other enterprise networks 530) with the appropriate microslice configurations.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open-ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of configuring microslices, including the steps of:
   receiving in a computer system, a plurality of inputs, the inputs including observed data inputs and deployment information inputs received from a plurality of enterprise networks, the inputs for each network including at least one of:
      applications for operation in at least one of the plurality of enterprise networks;
      devices for operation in at least one of the plurality of enterprise networks;
      enterprise type;
      network configuration information; and
      microslice configurations, including service type and bandwidth;
   examining the inputs;
   determining a list of applications based on the examination of the inputs;
   processing the inputs and the list of applications using machine learning and artificial intelligence techniques to associate enterprise types, the enterprise types having features in common with one another, the association being with at least one of the devices, applications, and microslices implemented in at least one of the plurality of enterprise networks, the plurality of enterprise networks having features in common with other enterprise networks;
   configuring a plurality of microslices based on the inputs and associations, including associating a plurality of microslices with a single application to generate new microslice configurations; and
   storing the new microslice configurations in a microslice repository.

2. The method of claim 1 further comprising associating the microslice configurations received in the processor with at least one of the enterprise types received in the processor and storing the received microslice configurations in the microslice repository as a template for the at least one enterprise type.

3. The method of claim 2 further comprising supplying the template to at least one of the enterprise networks for deployment in the at least one enterprise network.

4. The method of claim 1 further comprising defining a plurality of groups of microslices, each group associated with an application.

5. The method of claim 1 further comprising defining a plurality of groups of microslices, each group associated with a device type.

* * * * *